United States Patent
Tecuci et al.

(10) Patent No.: US 10,614,345 B1
(45) Date of Patent: Apr. 7, 2020

(54) MACHINE LEARNING BASED EXTRACTION OF PARTITION OBJECTS FROM ELECTRONIC DOCUMENTS

(71) Applicant: Ernst & Young U.S. LLP, New York, NY (US)

(72) Inventors: Dan G. Tecuci, Austin, TX (US); Ravi Kiran Reddy Palla, Sunnyvale, CA (US); Hamid Reza Motahari Nezhad, Los Altos, CA (US); Vincent Poon, Millbrae, CA (US); Nigel Paul Duffy, San Francisco, CA (US); Joseph Nipko, Austin, TX (US)

(73) Assignee: Ernst & Young U.S. LLP, New York, NY (US)

( * ) Notice: Subject to any disclaimer, the term of this patent is extended or adjusted under 35 U.S.C. 154(b) by 0 days.

(21) Appl. No.: 16/382,707

(22) Filed: Apr. 12, 2019

(51) Int. Cl.
*G06F 3/0482* (2013.01)
*G06K 9/62* (2006.01)
*G06K 9/00* (2006.01)
*G06N 3/02* (2006.01)
*G06N 20/20* (2019.01)

(52) U.S. Cl.
CPC ......... *G06K 9/6257* (2013.01); *G06F 3/0482* (2013.01); *G06K 9/00442* (2013.01); *G06K 9/6263* (2013.01); *G06N 3/02* (2013.01); *G06N 20/20* (2019.01); *G06K 2009/00489* (2013.01)

(58) Field of Classification Search
CPC ........................................................ G06F 15/18
USPC ...................................................... 706/15, 45
See application file for complete search history.

(56) References Cited

U.S. PATENT DOCUMENTS

| 6,735,748 B1 | 5/2004 | Teig et al. |
| 7,548,847 B2 | 6/2009 | Acero et al. |
| 8,165,974 B2 | 4/2012 | Privault et al. |
| 8,731,300 B2 | 5/2014 | Rodriquez et al. |
| 9,235,812 B2 | 1/2016 | Scholtes |
| 9,269,053 B2 | 2/2016 | Naslund et al. |

(Continued)

OTHER PUBLICATIONS

Staar, P. W. J. et al., "Corpus conversion service: A machine learning platform to ingest documents at scale," Applied Data Science Track Paper, KDD Aug. 2018, London, United Kingdom, pp. 774-782.

(Continued)

*Primary Examiner* — David R Vincent
(74) *Attorney, Agent, or Firm* — Cooley LLP (57) ABSTRACT

An object-extraction method includes generating multiple partition objects based on an electronic document, and receiving a first user selection of a data element via a user interface of a compute device. In response to the first user selection, and using a machine learning model, a first subset of partition objects from the multiple partition objects is detected and displayed via the user interface. A user interaction, via the user interface, with one of the partition objects is detected, and in response, a weight of the machine learning model is modified, to produce a modified machine learning model. A second user selection of the data element is received via the user interface, and in response and using the modified machine learning model, a second subset of partition objects from the multiple partition objects is detected and displayed via the user interface, the second subset different from the first subset.

16 Claims, 6 Drawing Sheets

(56) References Cited

U.S. PATENT DOCUMENTS

| | | | |
|---|---|---|---|
| 9,348,815 B1* | 5/2016 | Estes | G06F 17/2785 |
| 9,875,736 B2 | 1/2018 | Kim et al. | |
| 10,002,129 B1 | 6/2018 | D'Souza | |
| 10,062,039 B1 | 8/2018 | Lockett | |
| 2014/0223284 A1 | 8/2014 | Rankin, Jr. et al. | |
| 2015/0356461 A1 | 12/2015 | Vinyals et al. | |
| 2016/0078364 A1 | 3/2016 | Chiu et al. | |
| 2016/0162456 A1 | 6/2016 | Munro et al. | |
| 2016/0350280 A1 | 12/2016 | Lavallee et al. | |
| 2017/0083829 A1 | 3/2017 | Kang et al. | |
| 2017/0235848 A1* | 8/2017 | Van Dusen | H04L 41/04 705/12 |
| 2018/0060303 A1 | 3/2018 | Sarikaya et al. | |
| 2018/0157723 A1 | 6/2018 | Chougule et al. | |
| 2018/0181797 A1 | 6/2018 | Han et al. | |
| 2018/0204360 A1 | 7/2018 | Bekas et al. | |

OTHER PUBLICATIONS

Dong, R. et al., "Multi-input attention for unsupervised OCR correction," Proceedings of the 56th Annual Meetings of the Association for Computational Linguistics (Long Papers), pp. 2363-2372, Melbourne, Australia, Jul. 15-20, 2018.

Kharb, L. et al., "Embedding Intelligence through Cognitive Services," International Journal for Research in Applied Science & Engineering Technology (IJRASET), ISSN: 2321-9653; IC Value: 45.98; SJ Impact Factor:6.887, vol. 5, Issue XI, pp. 533-537, <Available online at www.ijraset.com>, Nov. 2017.

Paladines, J. et al., "An Intelligent Tutoring System for Procedural Training with Natural Language Interaction," Conference Paper, Jan. 2019, 9 pages.

Howard, J. et al., "Universal Language Model Fine-tuning for text classification," arXiv:1801.06146v5 [cs.CL], May 2018, 12 pages.

Xiang, R. Research Statement, Aug. 2018, 6 pages.

* cited by examiner

| Extraction Field Name | | |
|---|---|---|
| Asset Address<br>* Building located at 1134... | 564<br>Clear 🔍 🔍 | 566<br>Reset Field | 568<br>Confirm Field |
| *LEASE INFORMATION | Type to find < > 1 / < > | |
| Unit Reference<br>* Not yet reviewed | | |
| *LEASE PAYMENTS – BASE RENT | LEASE AGREEMENT | |
| Payment Date<br>* Not yet reviewed | BY AND BETWEEN | |
| Fixed Payment Amount<br>* Not yet reviewed | MOUNTAINCLIFF WATERMELON PROPERTIES LLC | |
| Rent Payment Frequency<br>* Not yet reviewed | AS LANDLORD | |
| Base Rent in advance/in arrears<br>* Not yet reviewed | AND | |
| *LEASE RENT REVISION | PHILIP A. THOMAS, LLP | |
| Any Periodic Rent Clauses?<br>* Not yet reviewed | AS TENANT | |
| Any Rent Review Clauses?<br>* Not yet reviewed | | |

MACHINE LEARNING BASED EXTRACTION OF PARTITION OBJECTS FROM ELECTRONIC DOCUMENTS

TECHNICAL FIELD

The present disclosure generally relates to electronic document review, and more specifically, to machine-learning based models for identifying and extracting objects relevant to a query associated with an electronic document.

BACKGROUND

"Document review" refers to the process of sorting and analyzing documents and their data. Electronic documents can be reviewed electronically, either as native files that were originally created electronically, or as electronic copies of documents that were originally created in hard copy format.

SUMMARY

In some embodiments, a method for extracting objects from electronic documents includes generating multiple partition objects (or "units of analysis") based on and associated with the electronic document, and receiving a first signal representing a user-selected data element via a user interface of a compute device. In response to receiving the first signal representing the user-selected data element and using a machine learning model, a first subset of partition objects from the multiple partition objects is detected. A representation of each partition object from the first subset of partition objects is displayed via the user interface. A user interaction, via the user interface, with a representation of a partition object from the first subset of partition objects is detected. In response to detecting the user interaction, the machine learning model is modified, by adjusting a weight of the machine learning model based on the user interaction, to produce a modified machine learning model. A second signal representing the user-selected data element is received via the user interface of the compute device. In response to receiving the second signal representing the user-selected data element and using the modified machine learning model, a second subset of partition objects from the multiple partition objects is detected, the second subset of partition objects different from the first subset of partition objects. A representation of each partition object from the second subset of partition objects is displayed via the user interface.

In some embodiments, a method for correcting errors in electronic documents includes generating a dataset that includes multiple value pairs, each value pair from the multiple value pairs including an error-free value and an error-containing value. A machine learning model is trained, using the dataset, to produce a trained machine learning model. An error in an electronically-stored file is detected, via the trained machine learning model, and in response to detecting the error, the electronically-stored file is converted, via the trained machine learning model, into a modified electronically-stored file that does not include the error.

In some embodiments, a method for correcting errors in electronic documents includes receiving, via a user interface of a compute device, a first signal that represents a user-selected data element for a first electronic document having an associated domain (e.g., document type). In response to receiving the first signal representing the user-selected data element, an error is detected in the first electronic document. In response to detecting the error, a modified electronic document is generated by identifying a value pair including an error-containing value that matches the error, and replacing a data segment of the first electronic document with an error-free value of the value pair. A set of objects associated with the modified electronic document is identified, in response to generating the modified electronic document, via a domain-specific machine learning model (e.g., a document type-specific machine learning model) for the domain. A representation of each object from the set of objects is displayed via the user interface. Upon detection of a user interaction, via the user interface, with a representation of an object from the set of objects, the domain-specific machine learning model is modified based on the user interaction to produce a modified machine learning model. A second signal representing a user-selected data element for a second electronic document having the associated domain is received, via the user interface of the compute device. In response to receiving the second signal representing the user-selected data element, and using the modified machine learning model, a set of objects associated with the second electronic document is detected, and a representation of each object from the set of objects associated with the second electronic document is displayed via the user interface.

DETAILED DESCRIPTION

Knowledge workers spend significant amounts of time reviewing electronic documents to locate information/data of interest. For example, when reviewing a contract (e.g., in a scanned, electronic form), a knowledge worker may manually search for one or more data elements of interest, such as "Start Date" or "Rent Amount," or for the presence or absence of contractual clauses of interest, such as "Termination Options." Known approaches for partially automating electronic document review processes typically involve considerable effort on the part of the knowledge worker, who provides annotations for large volumes of training data as part of model generation. Such known approaches generally involve the use of specialized tools, and the training of the associated models is often performed outside the regular workflow. As such, setting up and maintaining such systems can be prohibitively resource-intensive and time consuming. Moreover, the extraction of data (e.g., numeric, text, etc.) from electronic documents can be inefficient due to errors that are commonly introduced into electronic documents as a results of optical character recognition (OCR) processing, automated language translation and/or automated spell-checking of the electronic documents. Known models, such as named entity recognition (NER) models can generally detect a value for a sequence of characters, however, known NER models (whether classical or learning-based) typically cannot parse a sequence of characters that contains an OCR error, much less detect the value associated with the sequences of characters.

Object extraction systems and methods of the present disclosure address the foregoing issues by combining search, ranking, sequence labelling, error correction and online learning capabilities in a manner that accomplishes object extraction from electronic documents with a higher speed, improved quality, increased accuracy and/or improved efficiency, as compared with known systems, even with a relatively small amount of historical data. Moreover, as additional data is collected/captured during usage of the object extraction system/tool, the additional data can be used for retraining (e.g., of a machine learning model of the object extraction system), thereby further improving/optimizing the accuracy and/or efficiency of object extraction.

Extraction of Objects/Partitions from Electronic Documents

In some embodiments, an object extraction method includes dividing up the task of training of a custom data element extraction module into multiple distinct, lower-complexity subtasks that can be independently and/or continuously solved and improved upon. The subtasks can include one or more of (are not limited to): semantic search (e.g., when there is little or no data), ranking (e.g., to identify a most relevant document chunk (also referred to herein as a "partition") for a given data element), sequence labeling (e.g., for extracting the actual value from the most relevant document chunk), and online learning (e.g., to continuously improve the object extraction system as the user uses the tool). In some embodiments, the subtasks are combined and/or implemented in an adaptive fashion, depending on the available data. As used herein, a unit of analysis refers to any subset of an electronic document, and is also referred to herein as a "chunk," a "partition," an "object," or a "partition object." A data element refers to a subpart of a unit of analysis that contains either a value of interest (e.g. "Start Date" of a contract) or information from which a user can infer the value (e.g. the existence of a "Termination Option"). Sequence labeling refers to a pattern recognition task in which labels (e.g., categorical labels) are assigned (e.g., according to an algorithm) to each member/value of a sequence of observed values.

In some embodiments, a method for extracting objects from electronic documents (implemented by an object extraction system) begins with the definition (e.g., by a user) of one or multiple data elements (e.g., key words, data types, etc.). The definition of the data elements can be automatically incorporated into a domain ontology that may contain descriptions of the common concepts in the domain. Next, the object extraction system receives an indication of a data element of interest (e.g., via a graphical user interface (GUI) of a compute device of the object extraction system, from a user), and in response to receiving the indication of the data element of interest, retrieves and ranks document chunks/partitions from one or more electronic documents, optionally highlighting (e.g., graphically, via the GUI rendering thereof) or otherwise "flagging" the most likely matching document chunk(s)/partition(s) and/or value(s) of the data element (e.g. by applying an appropriate sequence labeling model). In some such implementations, the object extraction system performs the ranking (at least initially) by performing a semantic search using the domain ontology and/or the definition of the data elements.

Subsequently, as a user uses the object extraction system (e.g., during which a user navigates the electronic document(s) by viewing and/or moving it within the GUI), user selections made within the electronic document(s) and via the GUI are captured and used as training data to improve the retrieval, ranking, and highlighting of the object extraction system. For example, a machine learning model of the object extraction system can be modified based on (and, optionally, automatically and in response to) the user selections, with the user selections being used as training data, to produce an associated modified machine learning model. In some such implementations, as more user interactions are captured and used to retrain the machine learning model, the modified machine learning model(s) are given more weight for retrieval and ranking, relative to the weighting of the semantic search. Once a specified/predetermined threshold predictive accuracy and/or a specified/predetermined threshold number of user interactions has been reached, the semantic search may be turned off, removed or deactivated such that the modified machine learning model is exclusively used (i.e., without using the semantic search or any other type of search) for the retrieval and ranking. As an example, a specific series of models that can be employed in sequence (or at predefined times, for example in response to predetermined events according to one or more rules), according to some embodiments (e.g., for online learning, i.e., "learning on the job"), includes: a semantic model, a similarity model, and a machine learning model (e.g., a neural network). In some such implementations, transitions between models are based on or triggered by accuracy and/or on weights associated with the models. For example, a set of (e.g., 25) examples can be divided into a "test" data set and a "training" data set, and cross-validation based on the test data set and the training data set can be performed to calculate or detect an accuracy of a presently-employed model. If the calculated/detected accuracy is greater than a predetermined threshold "X," then machine learning may be employed (e.g., exclusively). If, however, the calculated/detected accuracy is less than the predetermined threshold "X," the object extraction system may revert to the use of a similarity model for training based on additional electronic documents.

In some embodiments, an object extraction system initially uses a baseline model (as an alternative to, or in addition to, a semantic search capability) that is pre-trained using commonly-used data elements, and the baseline model is updated during the user's use of the object extraction system, in accordance with the steps described above. The baseline model can include, for example, a ranking model. Ranking models can be effective with a relatively small amount of data for a given data element. As such, when a generic named-entity recognition (NER) model that identifies entities such as dates, money, organization, etc. is used as the initial sequence labeling model, the object extraction system can be trained using a fraction of the amount of data that would otherwise be needed to build a complex model to accurately extract values from a large electronic document. When the user selects a value for a data field, the value along with the surrounding context (document chunk or paragraph) is saved. The context is used to improve the ranking model and the value is used to improve the sequence labeling model. While the object extraction system continues to improve with user interaction, the ranking and sequence labeling models can be jointly trained when there is a sufficient amount of data to further improve the accuracy.

Correction of Errors

Optical character recognition (OCR) is a process by which an image of text (whether typed, printed, or handwritten) is electronically converted into machine-encoded and machine-readable text. For example, a first electronically-stored file (e.g., an "electronic document") can include image data representing text. The first electronically-stored file is converted into a second, machine-readable electronically-stored file. The OCR conversion of an electronically-stored file can introduce errors that are difficult to detect and/or repair. If, however, a "type" associated with one or more portions (e.g., data elements, strings, values) of the OCR-converted electronically-stored file (e.g., a data element type, a string type, or a value type) is detected or known, the speed, accuracy and/or effectiveness of remediation of such errors can be vastly improved, for example since the number of potentially identifiable candidate replacement data elements, strings, or values is considerably reduced.

In some embodiments, an object extraction system performs error correction/remediation for one or more error-containing data elements, strings, and/or values of an electronic document, based on an associated type of the data elements, strings, and/or values. The type of the one or more data elements, strings, and/or values can be detected by the object extraction system upon receipt and/or inspection thereof, and/or can be determined based on a type associated with the one or more data elements, strings, and/or values being stored in a memory of the object extraction system. In some such implementations, the remediation of OCR errors is also based on one or more user interactions, via a GUI of the object extraction system, with a representation the electronic document.

In some embodiments, targeted information extraction from one or more electronic documents is performed using a type-aware (e.g., context-dependent), learning based approach for converting/correcting values extracted, for example, from text of the electronic documents) that contains character recognition errors (e.g., optical character recognition (OCR) errors). Document value (e.g., text or numeric values) correction as described herein can be performed in an automated manner, for example using a machine learning model that learns (e.g., based on training data) to correct errors for strings having a defined string type (e.g., a "DATE," an "amount," etc.). For example, a string "S ept 5 200 1" received and/or inspected by the object extraction system can be detected by the object extraction system (e.g., in response to receiving the string) as including at least one error (in this example, the errant spaces between the "S" and the "e," and between the "0" and the "1"), and replaced with a corrected string "Sept 5 2001," identified by the object extraction system.

Hybrid Object Extraction and Textual Correction

In some embodiments, a method for object extraction and textual correction, implemented by an object extraction system, includes training a sequence-to-sequence model such that it exhibits the capability to translate error-containing strings (e.g., malformed OCR strings) having an associated data element type, string type, or value type, into one or more valid strings having the same data element type, string type, or value type. The method for object extraction and textual correction can include detection, by the object extraction system, of the data element type, string type, or value type for the error-containing string (e.g., which it is received and/or inspected by the object extraction system), and matching of the error-containing string to one or candidate replacement strings having the detected data element type, string type, or value type.

In some embodiments, for each data element type, string type, or value type, a dataset of pairs of values is generated or acquired/received by the object extraction system (e.g., from a remote compute device in network communication with the object extraction system). Information regarding the data element type, string type, and/or value type can be received at the object extraction system, for example, from an NER model executed locally (i.e., at the object extraction system) or a remote compute device accessible to the object extraction system via a network. Each pair of values can include an original value (e.g., pre-OCR conversion) and a converted value (e.g., including/containing one or more OCR-imparted errors). The dataset can then be used to train a sequence-to-sequence model such that the sequence-to-sequence model "learns" (i.e., develops the capability) to identify/detect and correct the OCR-imparted errors. In some implementations, the pairs of values in the dataset are based on actual/observed historical data. In other implementations, either in addition to the actual/observed dataset or instead of the actual/observed dataset, one or more artificial datasets can be generated (e.g., by introducing errors to an electronic document, for example by inserting errant spaces, changing "1" values to "I" values, changing "0" values to "O" values, etc.), and used to train the sequence-to-sequence model.

In some embodiments, a semantic model, or "ontology," for an electronic document is generated by capturing concepts and relationships relevant to the "domain" of that electronic document. For example, where the electronic document is a contract, the domain of the electronic document can be a subject matter descriptor that refers to a specified sphere of activity or knowledge (e.g., "real estate," "mortgage," "Non-Disclosure agreements," etc.) or a document type. An ontology can include a profile of "attributes of interest" for the electronic document (i.e., a single electronic document, optionally relevant only to that electronic document or electronic document type), the attributes of interest including, for example, known or expected fields associated with that electronic document, and/or known or expected fields associated with the domain of that electronic document. The profile can be defined a priori. For example, a profile for a sales contract can include a commencement date, an end date, a termination clause, and a sales price. As association between the profile and an electronic document identifier can be stored in a memory of the object extraction system. Where a document type has not previously been added to the object extraction system, a blank profile can be associated with the document type, and populated in response to subsequent inputs from a user (e.g., the user's indications of data elements of interest). During operation, the object extraction system can be initialized with an already-established ontology (i.e., a "reference ontology"), optionally associated with a single domain. The reference ontology can include parameters such as entity, date, time, etc., as well as concepts and relationships related to one or more pre-trained models. Ontologies of the present disclosure can be dynamically updated, for example during use (i.e., "online") when the user defines a new field.

As noted above, an example of a specific series of models that can be employed in sequence (or at predefined times, for example in response to predetermined events according to one or more rules), according to some embodiments (e.g., for online learning, i.e., "learning on the job"), includes: a semantic model, a similarity model, and a machine learning model (e.g., a neural network, such as a multilayer perceptron (MLP) model or a convolutional neural network (CNN)). In some embodiments, during operation of the object extraction system, partition objects (or units of analysis) within an electronic documents can be identified and ranked or scored based on a model that is currently in use within the object extraction system. Table 1, below, compares example descriptions and usages for three different types of models—a similarity model, a semantic model, and an MLP model.

| Model | Description | Usage |
|---|---|---|
| Similarity | Cosine similarity between added examples for a term and the partition objects for which prediction is to be performed | New and existing (pre-trained) fields, updated during initialization and online learning |
| Semantic | Full Semantic: Ontology-driven classification. Identifies definitions, occurrences of defined terms (e.g., "Lease Commencement Date"). Identifies entities (e.g., dates). Scores the partition object based on identified terms and entities, and extends the results to related terms based on the ontology. Pseudo Semantic: Cosine similarity between the 'description' for a term and the partition objects for which prediction is to be performed. The description of a term is derived from the ontology (synonyms, keywords, comments and/or description added by the user) | New and existing fields, updated online when new fields are added |
| MLP | A multi-layer perceptron | New and pre-trained fields. Trained or updated when the number of examples increases by a certain threshold. |

An example strategy for online learning/training for existing (pre-trained) fields is as follows. Initially, apply MLP (e.g., alone—not in combination with any other model) for pre-trained fields if the number of examples trained exceeds a threshold (e.g., 10 examples), and apply (pseudo) semantic and MLP models, in combination and with substantially equal weight applied to each, for all other fields. As examples are added for a given field, apply a similarity model with increasing weight, while reducing the weight for the (pseudo) semantic model (if applied for the given field) and for the MLP model (if the (pseudo) semantic model is not applied for the given field). Once the number of examples reaches a threshold (e.g., associated with an accuracy being above a certain level), the MLP and similarity models can be assigned substantially equal weights, and the (pseudo) semantic model can be disabled/removed. In some such implementations, the weights for the various models are not further changed beyond a time when the number of examples exceeds the threshold. The MLP model can continue to be updated when the number of examples increases by a threshold.

An example strategy for online learning/training for new (i.e., newly-added) fields, with no pre-trained models, is as follows. Initially, apply a (pseudo) semantic model (e.g., alone—not in combination with any other model). As examples are added, a similarity model is applied, with increasing weight, while reducing the weight for the (pseudo) semantic model. Once the number of examples reaches a threshold, the (pseudo) semantic model can be disabled/removed, and an MLP model can be trained for the new field. Once the MLP model has been trained, similarity and MLP models can be applied with substantially equal weights. The MLP model can continue to be updated when the number of examples increases by a threshold.

In some embodiments, an object extraction (also referred to herein as "entity recognition") method includes initially applying pre-trained NER model (e.g., the "spaCy" NER model) to identify/detect one or more standard/pre-defined entities (e.g., dates, monetary values, frequency values, etc.). Once the number of examples added for a field reaches a threshold, a custom entity recognition model (e.g., using sequence labeling) can be performed for the field, and the NER model can be replaced with the custom entity recognition model for the field to identify (and, optionally, to highlight or otherwise flag) the highest relevance (e.g., to a data element specified by a user) or matching values within an electronic document of interest/under review.

An example code snippet illustration of an online data capture is as follows:
Online data:
{
"contract": <id>,
"selected_unit_of_analysis": <string>,
"selected_unit_of_analysis_id": <id>,
"field_name": <string>,
"selected_unit_of_analysis_rank": <int>,
"selected_unit_of_analysis_entities": [selected_entity, . . . ],
"higher_ranked_units_of_analysis": [{"unit_of_analysis": <string>, "rank": <int>,
"unit_of_analysis_id":<id>}, . . . ],
}
Selected entity referenced in online data:
{
"ent_name": <string>,
"ent_type": data_type,
"start_index": <int>,
"end_index": <int>,
"ent_text": <string>
}
data type: DATE, MONEY, etc.

In some embodiments, an electronic document to be reviewed/analyzed is received in PDF format. The PDF document can be converted into a machine-readable form via an OCR conversion process, and optionally, OCR error correction can be performed (e.g., in response to the detection of one or more OCR-imparted errors), as set forth herein. The (optionally error-corrected) OCR'ed document is then broken up into a set of "chunks" or "partition objects," for example based on optical character recognition (OCR) software-generated bounding boxes, and the partition objects may be saved in a memory of the object extraction system (e.g., in a database thereof). The object extraction system can then receive, e.g., via a GUI thereof and in response to a user input, an indication of (i.e., a signal representing) a user-selected data element of interest (e.g., a field or field type of a document), for example "start date." In response to receiving the indication of the data element of interest, the object extraction system can rank the partition objects for the electronic document according to their relevance to the data element "start date," for example using a model (e.g., a machine learning model), thereby identifying a subset of the partition objects (e.g., exceeding a predetermined threshold of relevance or percentage predicted match). Each partition object can be a paragraph of text, a sentence, a phrase, a word, a sequence of characters, etc. The subset of partition objects deemed by the object extraction system to be relevant can be presented to the user, e.g., via the GUI, by highlighting or otherwise flagging the partition objects, and the user can "select" one or more of the presented partition objects. This selection can be viewed as a confirmation of the relevance of the selected partition object to the data element "start date," and accordingly can be used as feedback (e.g., as shown in the code snippet above) by the object extractions system to update, retrain or refine (optionally iteratively, with subsequent user interactions) one or more models thereof (e.g., for use in subsequent ranking procedures for that data element). After the one or models has/have been updated, retrained or refined based on the feedback, a subsequent user selection of the same user-selected data element of interest can be received at the object extraction system via the GUI. In response to receiving the subsequent user selection of the same user-selected data element of interest, the object extraction system can again rank the partition objects for the electronic document according to their relevance to the data element of interest, using the updated, retrained or refined model, to identify a further subset of the partition objects (e.g., exceeding a predetermined threshold of relevance or percentage predicted match) different from the previous subset of the partition objects. User feedback can also be stored in a memory of the object extraction system (e.g., in a database or an Excel spreadsheet thereof). In some such implementations, the user can input (e.g., in response to a prompt) via the GUI one or more annotations expressed either as highlights of the original text (e.g., selection of relevant words, etc.) or as specific values not included in the original text (e.g., due to OCR errors, or due to the fact that the values are not explicitly stated but are subsequently inferred), which may also be used to update, retrain or refine one or more models of the object extraction system.

In some embodiments, an optional training phase including user interactions precedes machine learning. For example, for a given electronic document, a user can be presented, via a GUI, with a training phrase, e.g., having the following format: "I found a commencement date in the following format: ______," and the user can fill in the blank (e.g. by pasting text) as an annotation that will subsequently be used by the object extraction system, e.g., for training a classification model and/or a ranking model. Alternatively or in addition, an auxiliary function can be implemented, via the GUI, by which a list of features for a given electronic document is presented to a user, and the user can indicate, via the GUI, "Yes, relevant" or "No, not relevant," or "thumbs up" or "thumbs down," as applicable, and the user interactions can be used for weighting (or other retraining) of a model of the object extraction system.

Object extraction systems of the present disclosure can facilitate the efficient definition, configuration, and extraction of data elements of interest from text or other electronic documents, with increased throughput, increased quality of information extracted, and faster time to decision as compared with known extraction methods.

Figure 1:
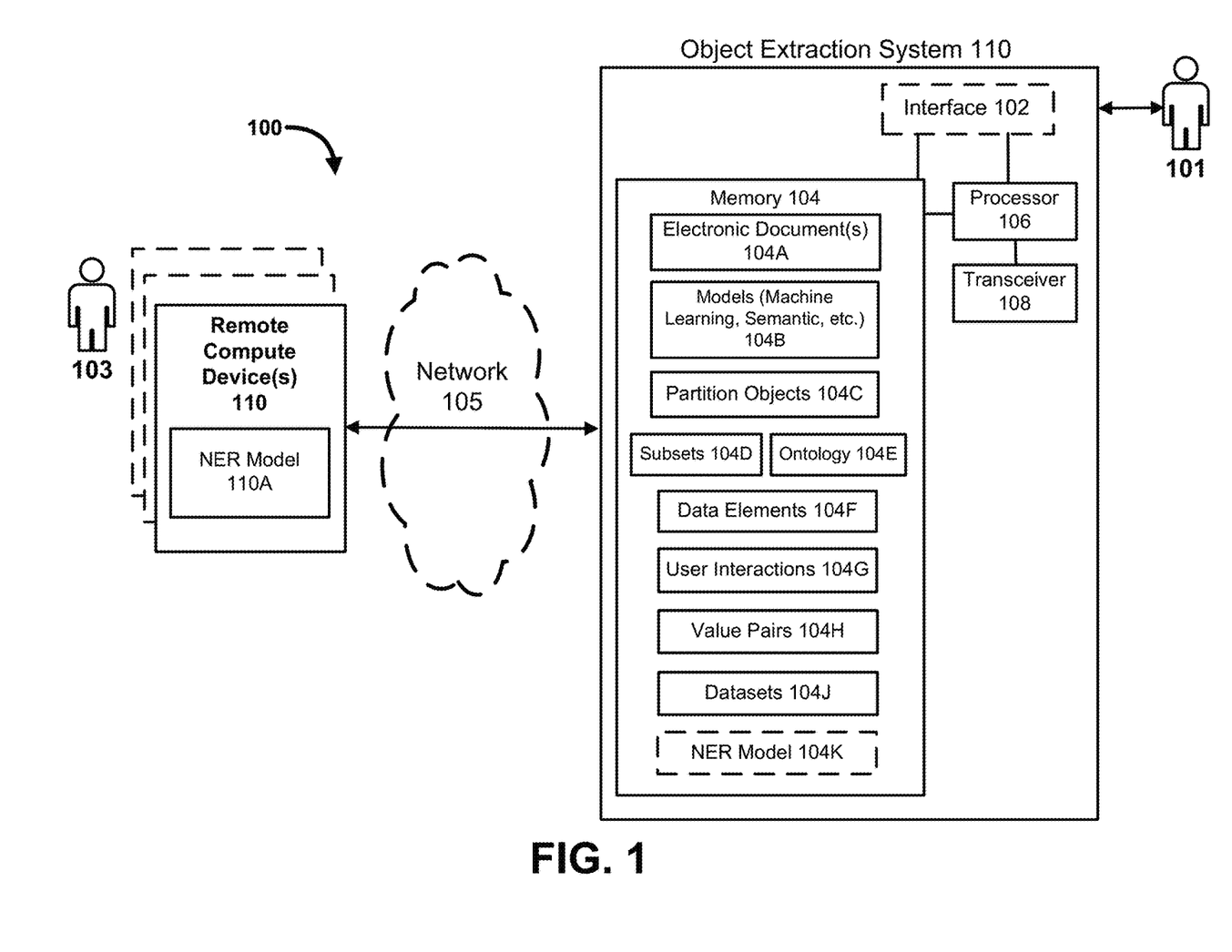
FIG. 1 is a system diagram illustrating a system for object extraction ("object extraction system") from and/or error correction in electronic documents, according to some embodiments.

FIG. 1 is a system diagram illustrating an object extraction system for object extraction from and/or error correction in electronic documents, according to some embodiments. As shown in FIG. 1, the object extraction system 110 includes a processor 106 operably coupled to a memory 104. The memory 104 stores one or more electronic documents (or other type of electronically-stored file) 104A, one or more models (e.g., machine learning models, semantic models, etc.) 104B, partition objects (or "units of analysis") 104C, subsets 104D, one or more ontologies 104E, data elements 104F, user interaction data 104G, value pairs 104H, datasets 104J, and, optionally, an NER model 104K, the discussion of each of which is set forth below and/or otherwise herein. The object extraction system 110 is in communication (e.g., using the transceiver 108 and via a wired or wireless network 105) with one or more remote compute devices 110 (optionally including an NER model 110A accessible by the object extraction system 110 via the network 105). In some implementations, the models 104B and/or the NER model 104K are implemented by the processor 106 (e.g., according to instructions stored in the memory 104). Processor 106 can refer to one or more hardware modules, each of which can be any of, for example, a general-purpose processor, a field programmable gate array (FPGA), and/or an application specific integrated circuit (ASIC). Methods (e.g., object extraction and/or error correction methods) described herein can be performed by software (stored in memory 104 and/or executed on hardware such as the processor 106), hardware, or a combination thereof. Software modules (executed on hardware) can be expressed in a variety of software languages (e.g., computer code), including Unix utilities, C, C++, Java™, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors (e.g., processor 106) as described above.

Figure 2:
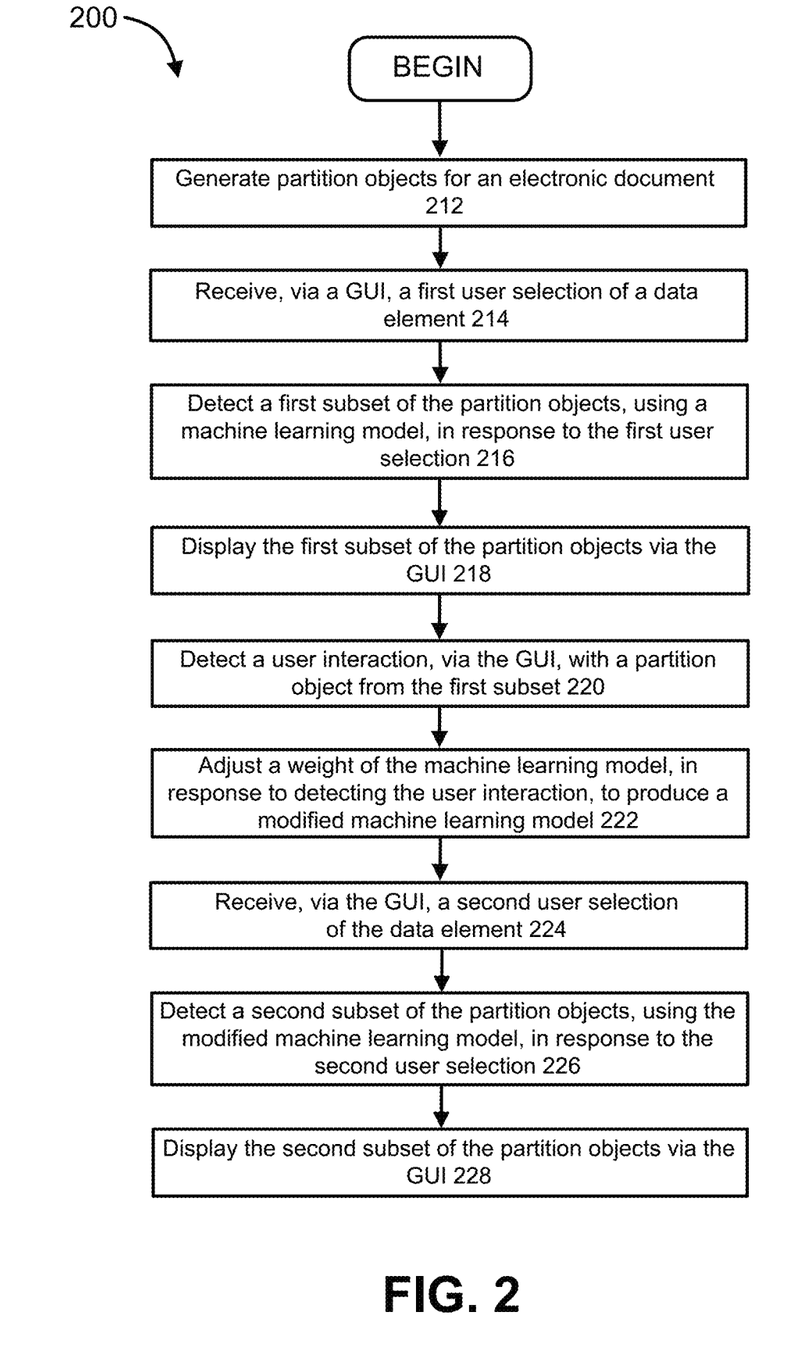
FIG. 2 is a flow diagram illustrating a method for extracting objects from electronic documents, according to some embodiments.

FIG. 2 is a flow diagram illustrating a method for extracting objects from electronic documents (implemented, for example, by an object extraction system, such as the object extraction system 100 in FIG. 1), according to some embodiments. As shown in FIG. 2, the object extraction method 200 includes generating, at 212, multiple partition objects for an electronic document. The generating the multiple partition objects can be based on the electronic document, and the multiple partition objects can be associated with the electronic document. At 214, a first signal representing a user-selected data element is received, via a user interface of a compute device (e.g., of the object extraction system). At 216, and in response to receiving the first signal representing the user-selected data element and using a machine learning model, a first subset of partition objects from the multiple partition objects is detected. The machine learning model can include, for example, at least one of: a named-entity recognition (NER) model, a semantic model, or a multilayer perceptron (MLP) model. A representation of each partition object from the first subset of partition objects is displayed via the user interface, at 218. In other words, extracted portions from the electronic document (e.g., paragraphs, sentences, sentence fragments, words, characters such as letters or numbers, etc.), associated with the first subset of partition objects, can be displayed/rendered (e.g., in a modified way, such as with highlighting, bolding, underlining, increased font size, modified color, etc.) in a location within the GUI, as shown and described further below with reference to FIGS. 5A-5B. At 220, a user interaction, via the user interface, with a representation of a partition object from the first subset of partition objects is detected, and at 222, in response to detecting the user interaction, a weight of the machine learning model is adjusted based on the user interaction, to produce a modified machine learning model. A second signal representing the user-selected data element is received at 224, via the user interface of the compute device (e.g., of the object extraction system), and in response to receiving the second signal representing the user-selected data element and using the modified machine learning model, a second subset of partition objects from the multiple partition objects is detected (at 226). The second subset of partition objects is different from the first subset of partition objects. At 228, a representation of each partition object from the second subset of partition objects is displayed, via the user interface of the compute device (e.g., of the object extraction system).

In some implementations of the object extraction method 200 of FIG. 2, the object extraction method 200 also includes detecting a cumulative number of user interactions, including the user interaction, associated with the user-selected data element, and the machine learning model is selected based on the cumulative number of user interactions associated with the user-selected data element. When the cumulative number of user interactions is greater than one but less than a threshold number of interactions, the machine learning model can include a combination of an MLP model and a similarity model, or a combination of a semantic model and a similarity model.

In some implementations of the object extraction method 200 of FIG. 2, the machine learning model includes a semantic model, and the object extraction method 200 also includes detecting that a number of user interactions associated with the user-selected data element exceeds a threshold number of interactions. In response to detecting that the number of user interactions associated with the user-selected data element exceeds a threshold number of interactions, the semantic model is replaced with a similarity model, and the similarity model is subsequently replaced with a multilayer perceptron (MLP) model. Transitions from the semantic model to the similarity model and/or from the similarity model to the MLP model can be based on and/or in response to, for example, a comparison of weights or accuracies of the models, or the accuracy of one of the models surpassing the accuracy of the other model.

In some implementations of the object extraction method 200 of FIG. 2, the machine learning model includes a MLP model, and the object extraction method 200 also includes detecting that a number of user interactions associated with the user-selected data element exceeds a threshold number of interactions. In response to detecting that the number of user interactions associated with the user-selected data element exceeds a threshold number of interactions, the MLP model is updated, e.g., via retraining of the MLP model.

Figure 3:
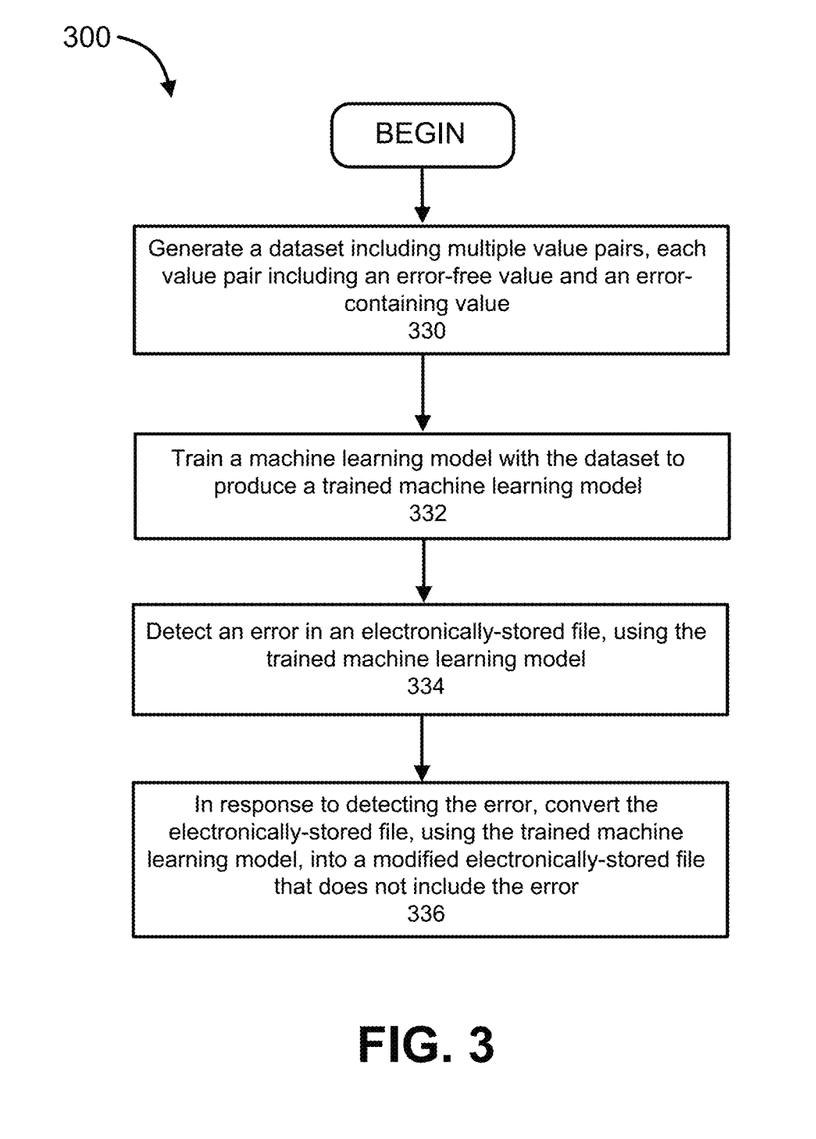
FIG. 3 is a flow diagram illustrating a method for correcting errors in electronic documents, according to some embodiments.

FIG. 3 is a flow diagram illustrating a method for correcting errors in electronic documents (implemented, for example, by an object extraction system, such as the object extraction system 100 in FIG. 1), according to some embodiments. As shown in FIG. 3, the method for correcting errors in electronic documents 300 includes generating a dataset, at 330, the dataset including multiple value pairs. Each value pair from the multiple value pairs can include an error-free value and an associated error-containing value (e.g., "Sept 5 2001" and "S ept 5 200 1," respectively). A machine learning model (e.g., including a sequence-to-sequence model and/or an attention algorithm) is trained at 332, using the dataset, to produce a trained machine learning model. The machine learning model and/or the trained machine learning model can be part of and/or operate within an artificial neural network. At 334, an error (e.g., an OCR-imparted error) in an electronically-stored file (e.g., a first electronic document) is detected via the trained machine learning model. The detection of the error in the electronically-stored file can include, for example, receiving, from a named-entity recognition (NER) model, a signal representing a non-extracted data string that is associated with the electronically-stored file. In response to detecting the error, the electronically-stored file is converted, at 336, via the trained machine learning model, into a modified electronically-stored file (e.g., a second electronic document) that does not include the error. The conversion of the electronically-stored file into the modified electronically-stored file can be based, for example, on a value pair from the plurality of value pairs that is associated with the detected error, by replacing a data segment of the electronically-stored file with the error-free value of the value pair from the plurality of value pairs, the data segment associated with the detected error.

Figure 4:
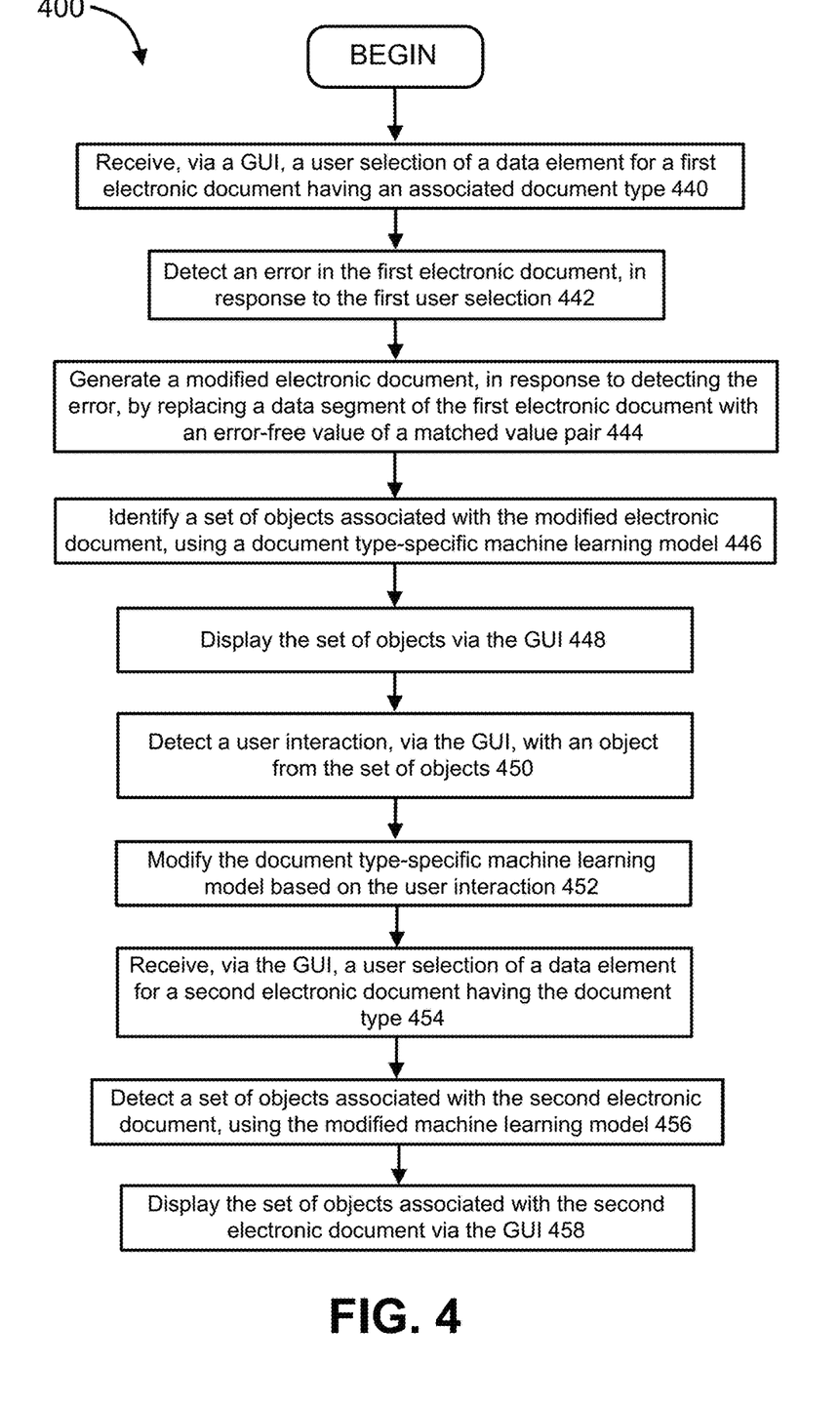
FIG. 4 is a flow diagram illustrating a method for correcting errors in electronic documents, according to some embodiments.

FIG. 4 is a flow diagram illustrating a method for correcting errors in electronic documents (implemented, for example, by an object extraction system, such as the object extraction system 100 in FIG. 1), according to some embodiments. As shown in FIG. 4, the method for correcting errors in electronic documents 400 includes receiving, at 440 and via a user interface of a compute device (e.g., of the object extraction system), a first signal representing a user-selected data element for a first electronic document having an associated document type. At 442, and in response to receiving the first signal representing the user-selected data element, an error in the first electronic document is detected. The detection of the error in the first electronic document can include, for example, receiving an error signal representing a non-extracted data string, associated with the first electronic document, from a named-entity recognition (NER) model. The error can include, for example, an OCR-imparted error. In response to detecting the error, a modified electronic document is generated, at 444, by identifying a value pair including an error-containing value that matches the error, and replacing a data segment of the first electronic document with an error-free value of the value pair. At 446, and in response to generating the modified electronic document, a set of objects associated with the modified electronic document is identified, via a document type-specific machine learning model for the document type, and a representation of each object from the set of objects is displayed, at 448, via the user interface. The document type-specific machine learning model can include, for example, at least one of a sequence-to-sequence model or an attention algorithm. Alternatively or in addition, the document type-specific machine learning model can operate within an artificial neural network (ANN).

At 450, a user interaction with a representation of an object from the set of objects, via the user interface, is detected. The document type-specific machine learning model is modified, at 452, in response to detecting the user interaction and based on the user interaction, to produce a modified machine learning model. A second signal representing a user-selected data element for a second electronic document having the associated document type is received, at 454, via the user interface of the compute device. In response to receiving the second signal representing the user-selected data element and using the modified machine learning model, a set of objects associated with the second electronic document is detected at 456, and a representation of each object from the set of objects associated with the second electronic document is displayed, via the user interface, at 458.

Figure 5A:
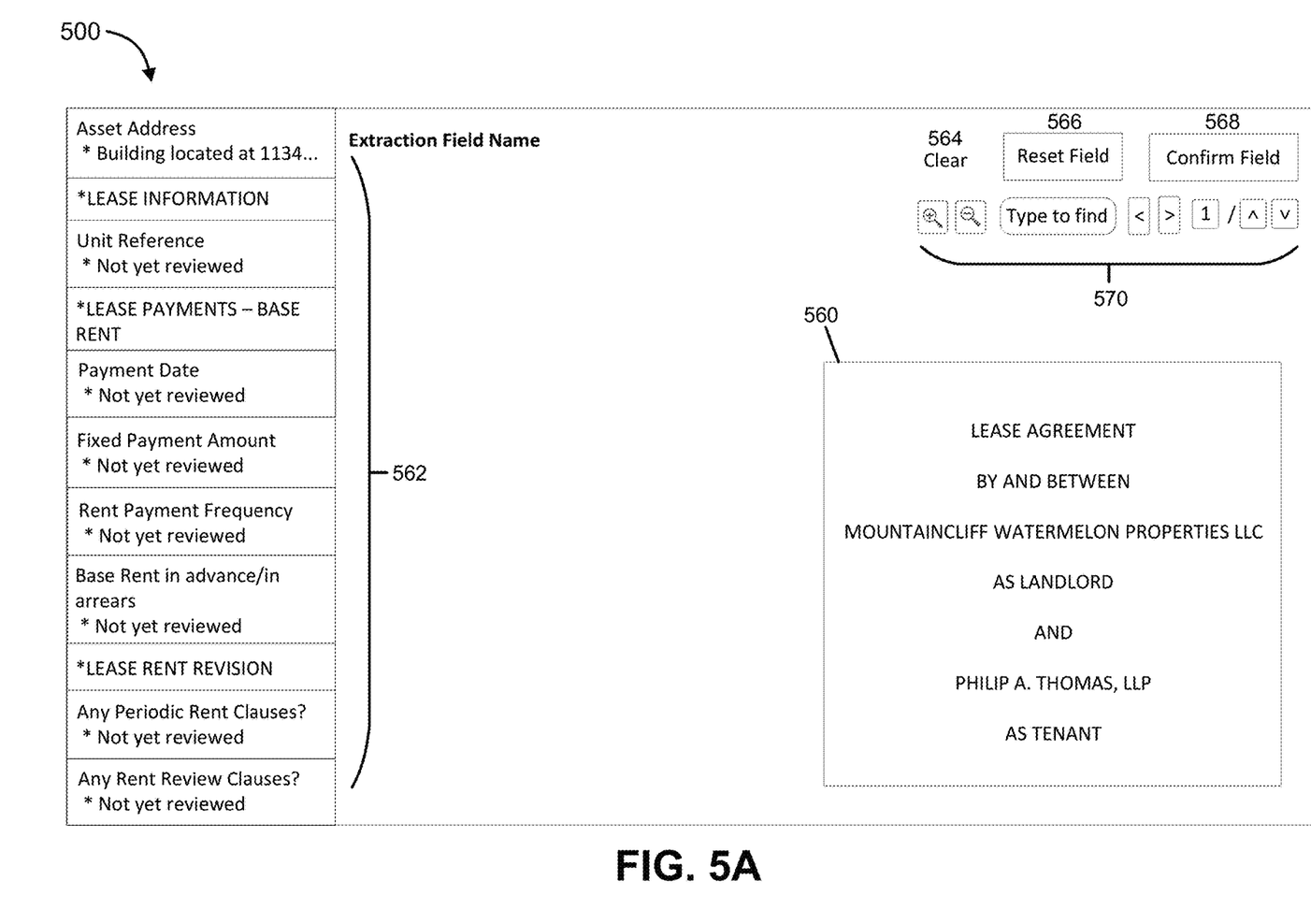
FIGS. 5A-5B are renderings of user interfaces during operation of a system for object extraction, according to some embodiments.
Figure 5B:
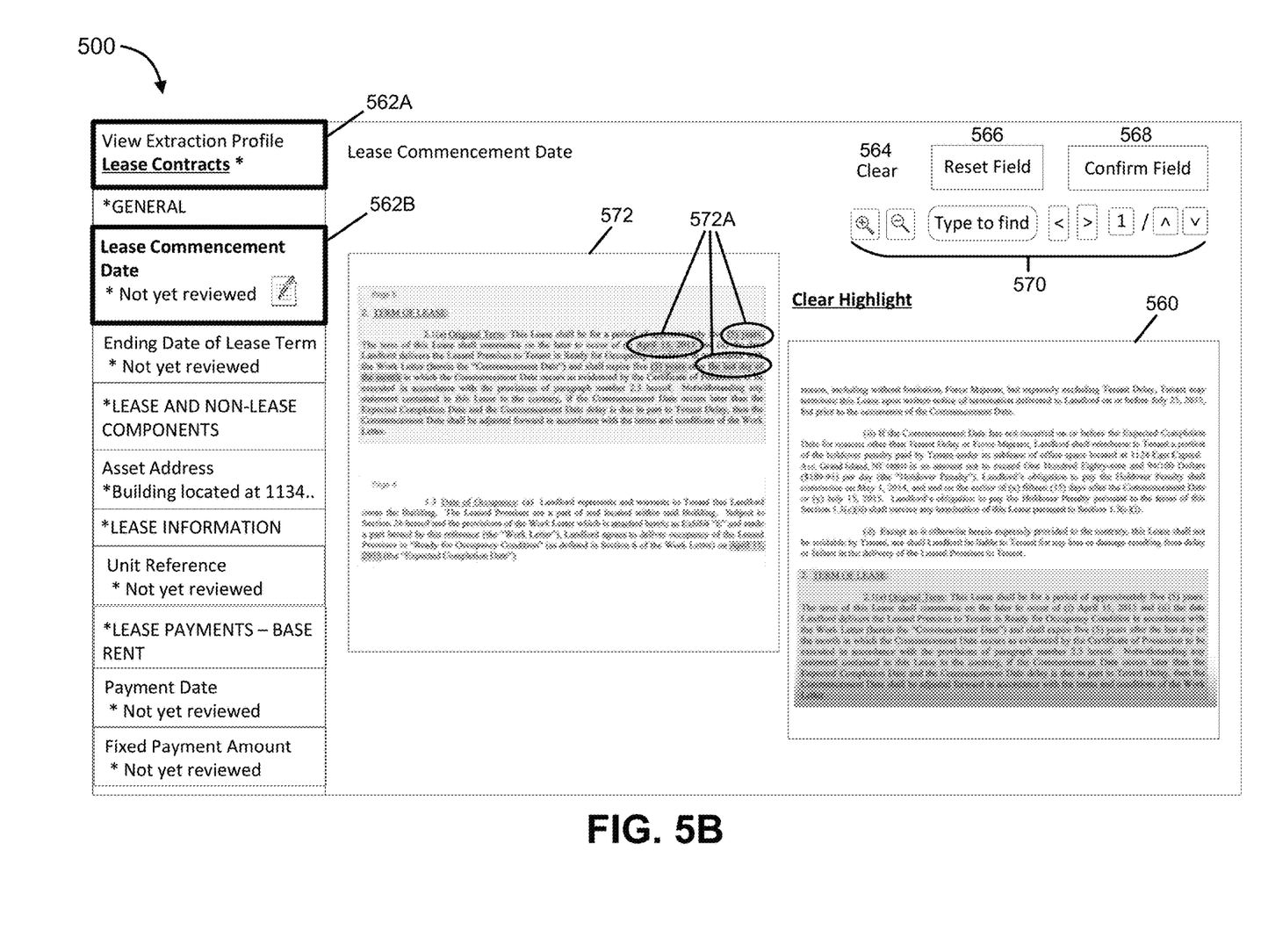

FIGS. 5A-5B are renderings of user interfaces during operation of a system for object extraction, according to some embodiments. During review of an electronic document, a user may view data that is displayed, e.g., via a GUI of an object extraction system, as shown in FIG. 5A. The data displayed 500 includes at least a portion of the electronic document 560 under review (in this example, a lease agreement), a set of extraction field names 562 (also referred to herein as "data elements"), a clear selector 564, a "reset field" selector 566, a "confirm field" selector 568, and navigation objects 570 (e.g., zoom in, zoom out, search input window, forward navigation button, reverse navigation button, page number display, page up button, and page down button, as shown in FIG. 5A). During the review of the electronic document by the user, the user can indicate, via the GUI and by interacting with the display 500, a user-selected data element (e.g., a field/term/phrase associated with lease agreements, such as "Lease Commencement Date"), for example by clicking on or highlighting the associated extraction field name, from the set of extraction field names 562 (see in FIG. 5B the bold border around the Lease Commencement Date 562B extraction field name, which the user may have scrolled to or otherwise navigated to within the set of extraction field names 562, since Lease Commencement Date does not appear within the visible portion of the listed extraction field names within the data displayed in the GUI of FIG. 5A). The set of extraction field names 562 can be auto-populated within the GUI window, for example, in response to detecting a document type and/or an extraction profile associated with the electronic document. The set of extraction field names 562 can include more extraction field names than fit within a display window of the GUI, and thus can be "Scrollable" or otherwise navigable by the user in response to interactions made by the user with, for example, and object within the GUI (e.g., a scroll bar). In response to the user selection of a user-selected data element from the set of extraction field names 562, and based on the user selection, the object extraction system detects a first subset of partition objects from multiple previously-identified partition objects, for example as described above with reference to FIG. 2. As shown in FIG. 5B, a representation of each partition object from the first subset of partition objects is displayed via the user interface (see, e.g., highlighted paragraph (titled "TERM OF LEASE") in electronic document 560, and the detailed view of individually highlighted matching terms and phrases 572A in the secondary window 572). Upon review of the highlighted terms, phrases and/or paragraphs, the user can identify a partition object of interest by interacting with the representation within the GUI of that partition object (e.g., by selecting it or clicking on it) and select the Confirm Field button 568. Where highlighted terms are not deemed by the user to be of interest, the user may ignore them or, in other implementations, may interact with a representation within the GUI of an object indicating that the highlighted term is not relevant to the user-selected data element (e.g., "reject," "discard," etc.).

A user selection of the Confirm Field button 568 can result in a weight of a machine learning model of the object extraction system (e.g., a weight associated with the selected partition object within the machine learning model) being adjusted (e.g., increased) based on the user interaction, to produce a modified machine learning model. A user selection of the object indicating that the highlighted term is not relevant to the user-selected data element can result in a weight of a machine learning model of the object extraction system (e.g., a weight associated with the selected partition object within the machine learning model) being adjusted (e.g., decreased) based on the user interaction, to produce a modified machine learning model. Subsequent to the adjustment to the weight of the machine learning model of the object extraction system, additional user selections of the Lease Commencement Date 562B extraction field name can result in the user-selected partition object of interest being displayed again (e.g., in a subsequent display of data within the GUI for that same electronic document, for example if reviewed again, or for another electronic document having the same profile associated with it), ranked higher (e.g., within the machine learning model) and/or differently displayed. In some implementations, the data displayed within the GUI is dynamically modified in response to user interactions with the GUI, e.g., such that additional terms or phrases are highlighted and/or such that highlighted terms are changed to not highlighted (e.g., in response to a "Confirm Field" interaction/selection or a "reject" interaction/selection).

All combinations of the foregoing concepts and additional concepts discussed herewithin (provided such concepts are not mutually inconsistent) are contemplated as being part of the subject matter disclosed herein.

The drawings are primarily for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. They are presented to assist in understanding and teach the embodiments.

It should be understood that they are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to claim such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A method, comprising:
generating, for an electronic document, a plurality of partition objects based on and associated with the electronic document;
receiving, via a user interface of a compute device, a first signal representing a user-selected data element of interest for the electronic document;
detecting, in response to receiving the first signal representing the user-selected data element and using a machine learning model, a first subset of partition objects from the plurality of partition objects based on a relevance of the first subset of partition objects to the user-selected data element of interest, the machine learning model including a semantic model;
displaying, via the user interface, a representation of each partition object from the first subset of partition objects;
detecting a user interaction, via the user interface, with a representation of a partition object from the first subset of partition objects, the user interaction representing a confirmation of relevance of the partition object from the first subset of partition objects;
in response to detecting the user interaction, modifying the machine learning model by adjusting a weight of the machine learning model based on the user interaction, to produce a modified machine learning model;
receiving, via the user interface of the compute device, a second signal representing the user-selected data element;
detecting, in response to receiving the second signal representing the user-selected data element and using the modified machine learning model, a second subset of partition objects from the plurality of partition objects, the second subset of partition objects different from the first subset of partition objects;
displaying, via the user interface, a representation of each partition object from the second subset of partition objects;
detecting that a number of user interactions associated with the user-selected data element exceeds a predefined threshold number of interactions;
in response to detecting that the number of user interactions associated with the user-selected data element exceeds the predefined threshold number of interactions, replacing the semantic model with a similarity model; and
subsequently replacing the similarity model with a multilayer perceptron (MLP) model.

2. The method of claim 1, further comprising:
detecting a cumulative number of user interactions, including the user interaction, associated with the user-selected data element,
the machine learning model being selected based on the cumulative number of user interactions associated with the user-selected data element.

3. The method of claim 2, wherein, when the cumulative number of user interactions is greater than one but less than the predefined threshold number of interactions, the machine learning model includes a combination of the MLP model and the similarity model.

4. The method of claim 2, wherein, when the cumulative number of user interactions is greater than one but less than the predefined, threshold number of interactions, the machine learning model includes a combination of the semantic model and the similarity model.

5. A method, comprising:
generating, for an electronic document, a plurality of partition objects based on and associated with the electronic document;
receiving, via a user interface of a compute device, a first signal representing a user-selected data element of interest for the electronic document;
detecting, in response to receiving the first signal representing the user-selected data element and using a machine learning model, a first subset of partition objects from the plurality of partition objects based on a relevance of the first subset of partition objects to the user-selected data element of interest, the machine learning model including a multilayer perceptron (MLP) model;
displaying, via the user interface, a representation of each partition object from the first subset of partition objects;
detecting a user interaction, via the user interface, with a representation of a partition object from the first subset of partition objects, the user interaction representing a confirmation of relevance of the partition object from the first subset of partition objects;
in response to detecting the user interaction, modifying the machine learning model by adjusting a weight of the machine learning model based on the user interaction, to produce a modified machine learning model;
receiving, via the user interface of the compute device; a second signal representing the user-selected data element;
detecting, in response to receiving the second signal representing the user-selected data element and using the modified machine learning model, a second subset of partition objects from the plurality of partition objects, the second subset of partition objects different from the first subset of partition objects;
displaying, via the user interface, a representation of each partition object from the second subset of partition objects;
detecting that a number of user interactions associated with the user-selected data element exceeds a predefined threshold number of interactions;
in response to detecting that the number of user interactions associated with the user-selected data element exceeds the predefined threshold number of interactions, updating the MLP model.

6. The method of claim 5, further comprising:
detecting a cumulative number of user interactions, including the user interaction, associated with the user-selected data element, the machine learning model being selected based on the cumulative number of user interactions associated with the user-selected data element.

7. The method of claim 6, wherein, when the cumulative number of user interactions is greater than one but less than the predefined threshold number of interactions, the machine learning model includes a combination of the MLP model and a similarity model.

8. The method of claim 6, wherein, when the cumulative number of user interactions is greater than one but less than the predefined threshold number of interactions, the machine learning model includes a combination of a semantic model and a similarity model.

9. A method, comprising:
   generating, for an electronic document, a plurality of partition objects based on and associated with the electronic document;
   receiving, via a user interface of a compute device, a first signal representing a user-selected data element of interest for the electronic document;
   detecting, in response to receiving the first signal representing the user-selected data element and using a machine learning model, a first subset of partition objects from the plurality of partition objects based on a relevance of the first subset of partition objects to the user-selected data element of interest;
   displaying, via the user interface, a representation of each partition object from the first subset of partition objects;
   detecting a user interaction, via the user interface, with a representation of a partition object from the first subset of partition objects, the user interaction representing a confirmation of relevance of the partition object from the first subset of partition objects;
   in response to detecting the user interaction, modifying the machine learning model by adjusting a weight of the machine learning model based on the user interaction, to produce a modified machine learning model;
   receiving, via the user interface of the compute device, a second signal representing the user-selected data element;
   detecting, in response to receiving the second signal representing the user-selected data element and using the modified machine learning model, a second subset of partition objects from the plurality of partition objects, the second subset of partition objects different from the first subset of partition objects;
   displaying, via the user interface, a representation of each partition object from the second subset of partition objects; and
   detecting a cumulative number of user interactions, including the user interaction, associated with the user-selected data element,
   the machine learning model being selected based on the cumulative number of user interactions associated with the user-selected data element.

10. The method of claim 9, wherein the machine learning model includes a named-entity recognition (NER) model.

11. The method of claim 9, wherein the machine learning model includes a semantic model, the method further including:
    detecting that a number of user interactions associated with the user-selected data element exceeds a predefined threshold number of interactions;
    in response to detecting that the number of user interactions associated with the user-selected data element exceeds the predefined threshold number of interactions, replacing the semantic model with a similarity model; and
    subsequently replacing the similarity model with a multilayer perceptron (MLP) model.

12. The method of claim 9, wherein the machine learning model includes a MLP model, the method further including:
    detecting that a number of user interactions associated with the user-selected data element exceeds a predefined threshold number of interactions; and
    in response to detecting that the number of user interactions associated with the user-selected data element exceeds the predefined threshold number of interactions, updating the MLP model.

13. The method of claim 9, wherein, when the cumulative number of user interactions is greater than one but less than a predefined threshold number of interactions, the machine learning model includes a combination of an MLP model and a similarity model.

14. The method of claim 9, wherein, when the cumulative number of user interactions is greater than one but less than a predefined threshold number of interactions, the machine learning model includes a combination of a semantic model and a similarity model.

15. The method of claim 1; further comprising comparing one of a weight or an accuracy of the similarity model with one of a weight or an accuracy of the MLP model, wherein the replacing the similarity model with the MLP model is in response to determining that the one of the weight or the accuracy of the MLP model exceeds the one of the weight or the accuracy of the similarity model.

16. The method of claim 9, further comprising:
    comparing one of a weight or an accuracy of the modified machine learning model with one of a weight or an accuracy of a further machine learning model; and
    transitioning from the modified machine learning model to the further machine learning model when the one of the weight or the accuracy of the further machine learning model exceeds the one of the weight or the accuracy of the modified machine learning model.

* * * * *

UNITED STATES PATENT AND TRADEMARK OFFICE
CERTIFICATE OF CORRECTION

| | |
|---|---|
| PATENT NO. | : 10,614,345 B1 |
| APPLICATION NO. | : 16/382707 |
| DATED | : April 7, 2020 |
| INVENTOR(S) | : Dan G. Tecuci et al. |

Page 1 of 1

It is certified that error appears in the above-identified patent and that said Letters Patent is hereby corrected as shown below:

In the Specification

Column 6, Line 28: "0" should be "O"

In the Claims

Column 18, Line 15 (Claim 4): the first "," should be removed

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*